US011604593B2

(12) United States Patent
Akamatsu

(10) Patent No.: US 11,604,593 B2
(45) Date of Patent: Mar. 14, 2023

(54) CONTROL APPARATUS THAT IMPROVES RECORDING OF DATA IN A RECORDING MEDIUM BY ALLOCATING DIRECTORY CLUSTERS TO RECORDING UNITS IN A MORE EFFECTIVE MANNER, AND CONTROL METHOD AND NON-TRANSITORY COMPUTER READABLE STORAGE MEDIUM STORING INSTRUCTIONS THEREOF

(71) Applicant: CANON KABUSHIKI KAISHA, Tokyo (JP)

(72) Inventor: Ryo Akamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/986,690

(22) Filed: Aug. 6, 2020

(65) Prior Publication Data
US 2021/0055877 A1    Feb. 25, 2021

(30) Foreign Application Priority Data

Aug. 23, 2019  (JP) .............................. JP2019-152798

(51) Int. Cl.
*G06F 3/06* (2006.01)
*G06F 16/906* (2019.01)

(52) U.S. Cl.
CPC .......... *G06F 3/0644* (2013.01); *G06F 3/0604* (2013.01); *G06F 3/0679* (2013.01); *G06F 16/906* (2019.01)

(58) Field of Classification Search
CPC ..... G06F 3/0644; G06F 3/0643; G06F 16/906
See application file for complete search history.

(56) References Cited

U.S. PATENT DOCUMENTS

| 5,363,487 A * | 11/1994 | Willman ............... G06F 16/10 710/8 |
| 2015/0036997 A1 * | 2/2015 | Omori .................... H04N 5/772 386/226 |
| 2017/0177274 A1 * | 6/2017 | Mylly ................... G06F 3/0673 |
| 2019/0354306 A1 * | 11/2019 | Maeda ................. G06F 3/0679 |
| 2020/0150873 A1 * | 5/2020 | Saxena ................ G06F 3/0679 |

FOREIGN PATENT DOCUMENTS

JP    2011-164733 A    8/2011

* cited by examiner

*Primary Examiner* — David Yi
*Assistant Examiner* — Nicholas A. Paperno
(74) *Attorney, Agent, or Firm* — Canon U.S.A., Inc. IP Division

(57) ABSTRACT

A control apparatus configured to record data in a recording medium includes a cluster management unit configured to manage clusters in a predetermined area in a recording area of the recording medium, a recording management unit configured to manage clusters in the predetermined area in recording units each having a predetermined size larger than each cluster size, and a directory cluster allocation unit configured to set a cluster in the predetermined area to a directory cluster in which a directory is recorded. The directory cluster allocation unit is configured to allocate a cluster out of clusters in a tail end area in the predetermined area to the directory cluster, the clusters in the tail end area being smaller than a size of the recording units having the predetermined size and being not managed by the recording management unit.

10 Claims, 13 Drawing Sheets

FIG.6

| 604 | 605 | 602 | 603 | 601 | | | |
|---|---|---|---|---|---|---|---|
| 0xFFFF_FFF8 | END | 0x4 | END | 0x00 | 0x00 | 0x00 | 0x00 |
| 0x00 | 0x00 | 0x00 | 0x00 | 0x00 | 0x00 | 0x00 | 0x00 |
| ⋮ | | | | | | | |
| 0x00 | 0x00 | 0x00 | 0x00 | 0x00 | 0x00 | 0x00 | 0x00 |
| 0x00 | 0x00 | 0x00 | 0x00 | | | | |

~303

CONTROL APPARATUS THAT IMPROVES RECORDING OF DATA IN A RECORDING MEDIUM BY ALLOCATING DIRECTORY CLUSTERS TO RECORDING UNITS IN A MORE EFFECTIVE MANNER, AND CONTROL METHOD AND NON-TRANSITORY COMPUTER READABLE STORAGE MEDIUM STORING INSTRUCTIONS THEREOF

BACKGROUND

Field

The present disclosure relates to a control apparatus that controls recording of data in a recording medium, a control method of a recording apparatus, and a computer readable storage medium.

Description of the Related Art

A removable small-sized recording medium, such as a Secure Digital (SD) card, a CompactFlash® (CF) card, and a CFexpress card, is often used as a recording medium of a recording apparatus (recording control apparatus), such as a digital camera. In such a small-sized recording medium, a File Allocation Table (FAT) file system is often used as a file system format.

In such a small recording medium, a minimum access unit, which is referred to as a sector, is used for a management of information to be recorded. In the FAT file system, a unit referred to as a cluster, which is composed of a plurality of sectors, is used for the management of the information. The information to be recorded includes a main body of data (file) (i.e., a still image, and a moving image), and a directory indicating directory entries that are metadata for the management of the main body of data.

In a NAND flash memory typically used in SD cards or the like, a minimum unit written in response to a request for writing at one time is referred to as a page. A written page cannot be overwritten in a page unit. In a case of changing contents of the written page, it is required to have procedures of temporarily retracting the contents written in a block unit having a plurality of consecutive pages to a volatile memory, erasing all the data in a block, and writing the contents edited on the volatile memory.

In lieu of such characteristics, writing performance degrades when rewriting of pages smaller than the block unit frequently occurs. Since writing real-time data, such as a moving image in particular, needs to be completed within a certain period of time, the data is desirable to be written without rewriting the pages. Thus, in the case of recording real-time data, rewriting an entire block improves recording performance in a recording medium. When rewriting the entire block, if a block size of the recording medium is larger than a size of a cluster, which is a management unit in the FAT file system, data is recorded in an Allocation Unit (AU) corresponding to the block size. An AU size is determined depending on the recording medium. The size is equal to the block size or equal to an integral multiple of the block size. In real-time data writing, control is performed to rewrite the entire block by recording the data in the AU composed of a plurality of consequent clusters, instead of recording the data in the cluster unit, and thereby improving recording performance of the recording medium.

For recording the data, on the other hand, a directory that records directory entries that are metadata of the data is required. The directory is configured on a cluster-by-cluster basis, and an identical area is updated multiple times.

Japanese Patent Application Laid-Open No. 2011-164733 discusses that, in a case where a plurality of directories (directory entries) is arranged in different AUs of the recording medium, sequentially rearranging free AUs from a head of the AUs improves writing performance.

In the configuration of the above described prior art, however, the directories are arranged in a free AU capable of recording data at the time of writing of data in a writing speed guarantee mode. Examples of the writing speed guarantee mode include Speed Class for SD cards, and Video Performance Guarantee (VPG) for CFexpress cards.

As described above, in the real-time data writing, control is performed to rewrite data in the AU (block unit), so that an AU (block) in which at least one directory is recorded is an AU (block) in which data cannot be recorded. In recent years, there has been a trend toward increase in AU (block) size along with increase of recording media capacity. Thus, a great capacity loss occurs due to the directory recorded in the AU (block).

SUMMARY

The present disclosure is directed to providing a control apparatus to record a directory without decreasing capacity efficiency of a recording medium by allocating an area that is unlikely to be used for recording data in the recording medium to a directory.

According to an aspect of the present disclosure, a control apparatus configured to record data in a recording medium includes a cluster management unit configured to manage clusters in a predetermined area in a recording area of the recording medium, a recording management unit configured to manage clusters in the predetermined area in recording units, each of the recording units having a predetermined size that is larger than a size of each of the clusters, and a directory cluster allocation unit configured to set a cluster out of the clusters in the predetermined area to a directory cluster in which a directory is recorded. The directory cluster allocation unit is configured to allocate a cluster out of clusters in a tail end area in the predetermined area to the directory cluster, the clusters in the tail end area being less than a size of each of the recording units having the predetermined size and being not managed by the recording management unit.

Further features will become apparent from the following description of exemplary embodiments with reference to the attached drawings.

BRIEF DESCRIPTION OF THE DRAWINGS

FIG. 6 is a diagram illustrating a File Allocation Table (FAT).

DESCRIPTION OF THE EMBODIMENTS

A digital camera 100 including a recording apparatus according to a first exemplary embodiment of the present disclosure will be described with reference to FIGS. 1 to 11. The digital camera 100 records captured moving image data in a recording medium 109.

Figure 1:
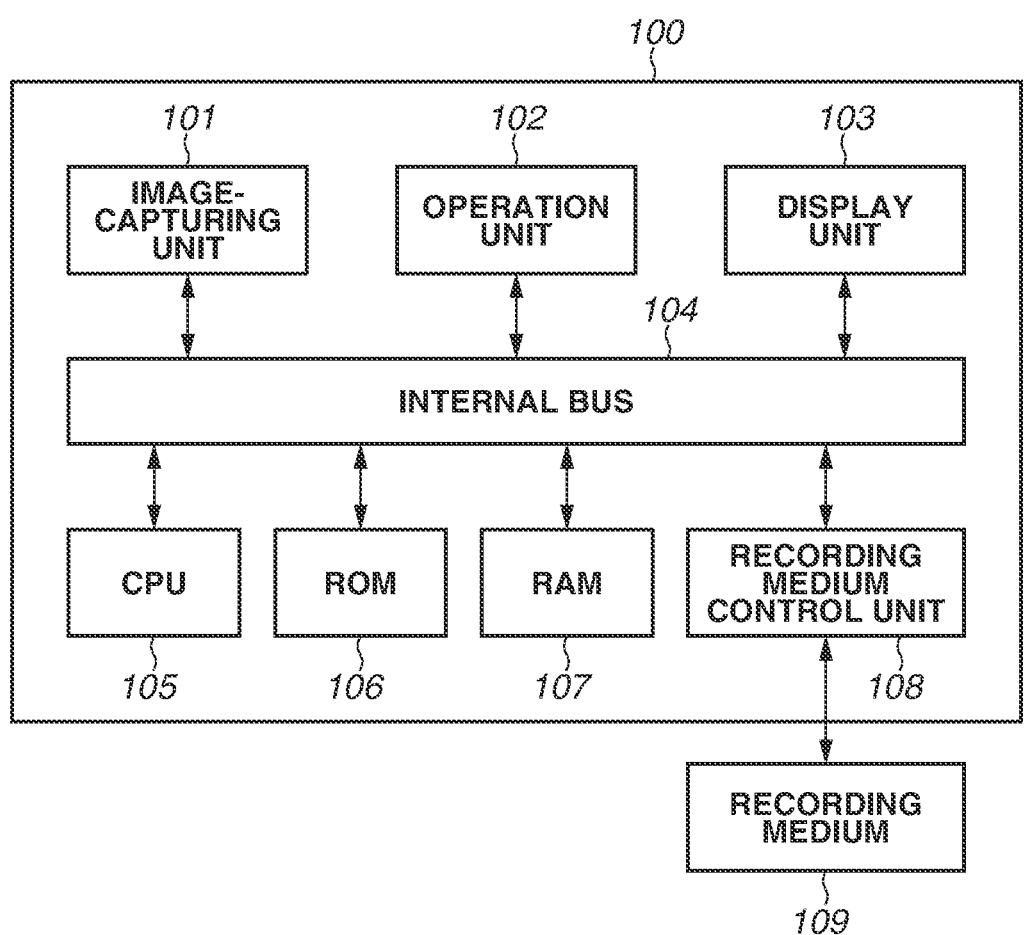
FIG. 1 is a block diagram schematically illustrating an internal configuration of a digital camera.

FIG. 1 is a block diagram illustrating an internal configuration of the digital camera 100 according to the present exemplary embodiment. The digital camera 100 includes an image-capturing unit 101, an operation unit 102, a display unit 103, a central processing unit (CPU) 105, a read-only memory (ROM) 106, a random-access memory (RAM) 107, a recording medium control unit 108, and the recording medium 109. These units are connected to one another via an internal bus 104 as illustrated in FIG. 1.

The image-capturing unit 101 includes an imaging sensor and generate image data. The operation unit 102 includes operation buttons and a touch panel that accept various operations from a user, and notifies the CPU 105 of the operations accepted by the operation unit 102. The CPU 105 executes processing based on the operations accepted by the operation unit 102. The display unit 103 includes a liquid crystal display and displays the image data generated by the image-capturing unit 101. The ROM 106 is a nonvolatile memory configured to store in advance a program that controls the digital camera 100 and data. The RAM 107 is an area that temporarily stores a program supplied from the ROM 106 or the like and a variety of data such as image data and setting data. The CPU 105 reads the program stored in the ROM 106 or the RAM 107, executes a variety of arithmetic processing, and controls each unit of the digital camera 100. Examples of the recording medium 109 include a removable small recording medium, such as a Secure Digital (SD) card, a CompactFlash® (CF) card, and a memory card in conformity with the CFexpress standard. The recording medium 109 according to the present exemplary embodiment is a recording medium in which data to be recorded is managed in a cluster unit by a File Allocation Table (FAT) file system. The recording medium control unit 108 is physically and electrically connected to the recording medium 109, and controls writing data in the recording medium 109 and reading the data from the recording medium 109. The data includes digital image data, which has been captured and subjected to a variety of processing by the image-capturing unit 101, and management data.

The digital camera 100, upon an instruction for capturing an image input from the operation unit 102, captures images and generates image data with the image-capturing unit 101. The image data is subjected to a variety of image processing and compression processing by an image processing unit (not illustrated), and is temporarily stored in the RAM 107. The image data stored in the RAM 107 is recorded as an image file in the recording medium 109 through the recording medium control unit 108. The digital camera 100 is capable of recording moving image data in the recording medium 109. The moving image data is captured during a period between a time when an instruction to start recording is input from the operation unit 102 and a time when an instruction to end recording is input from the operation unit 102.

In the recording medium 109, when requested for writing data by the recording medium control unit 108, written contents are temporarily retracted in the block unit to a volatile memory in the recording medium 109, and all the data in a block is erased, as described above. Subsequently, the data, which has been requested to be written, is edited on the volatile memory in the recording medium 109, and the edited data of the entire block is written in a block, so that the writing of the data requested by the recording medium control unit 108 is performed. Thus, writing performance degrades when rewriting of data having a size smaller than the size of the block frequently occurs. Writing real-time data, such as a moving image in particular, needs to be completed within a certain period of time.

Rewriting the entire block, instead of rewriting only part of the block, improves recording performance of the recording medium 109, and thereby enabling writing in a writing speed guarantee mode that guarantees a writing speed. As described above, examples of the writing speed guarantee mode include Speed Class for SD cards, and Video Performance Guarantee (VPG) for CFexpress cards. In the writing speed guarantee mode, data is written in an Allocation Unit (AU), which is larger in size than a cluster, as a recording unit. An AU size is determined for each type of a recording medium, and is equal to a block size. Alternatively, the AU size may be equal to an integral multiple of the block size. In the writing speed guarantee mode, control is performed to rewrite the entire block by recording data in units of AU, thereby enabling improved recording performance of the recording medium 109. However, since data is recorded in units of AU, there are constraints that data can be recorded only in a free AU in which no data is recorded. That is, in the writing speed guarantee mode, data cannot be recorded in an AU that contains a cluster in which data is recorded, even if the AU contains a cluster in which no data is recorded.

Figure 2:
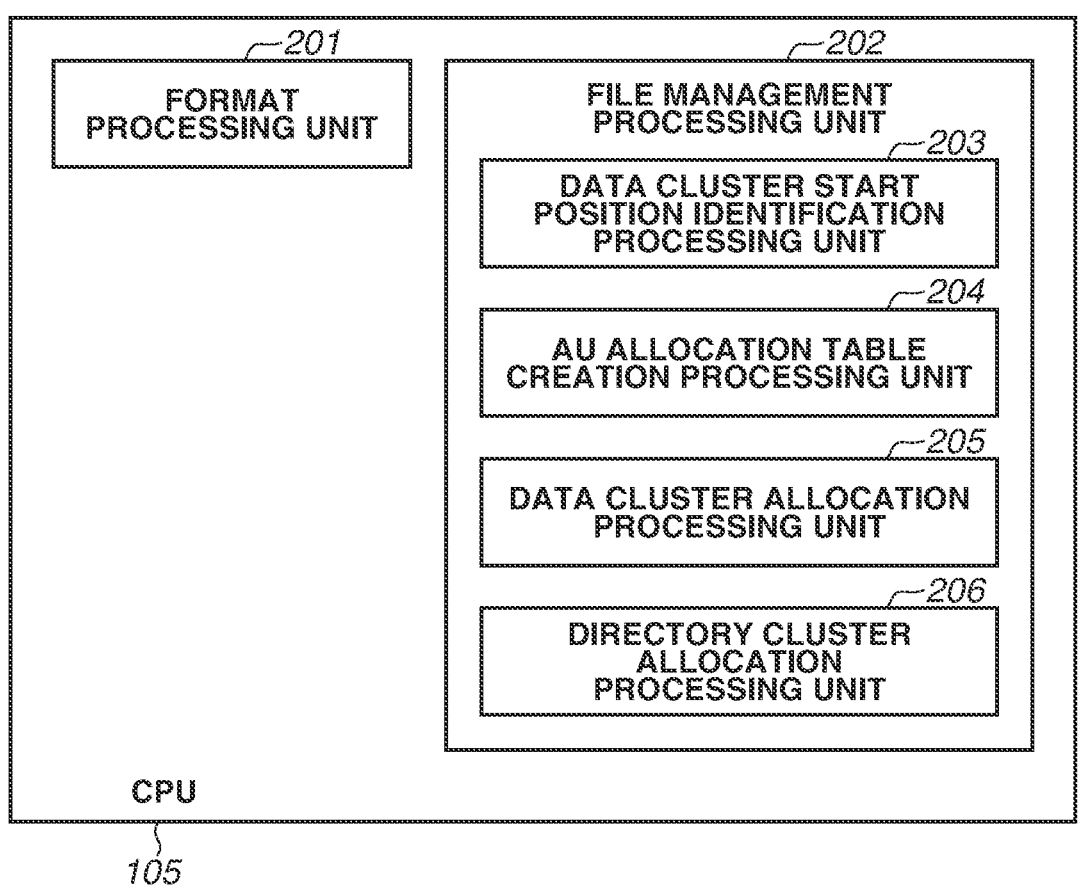
FIG. 2 is a functional block diagram of a central processing unit (CPU).
Figure 3:
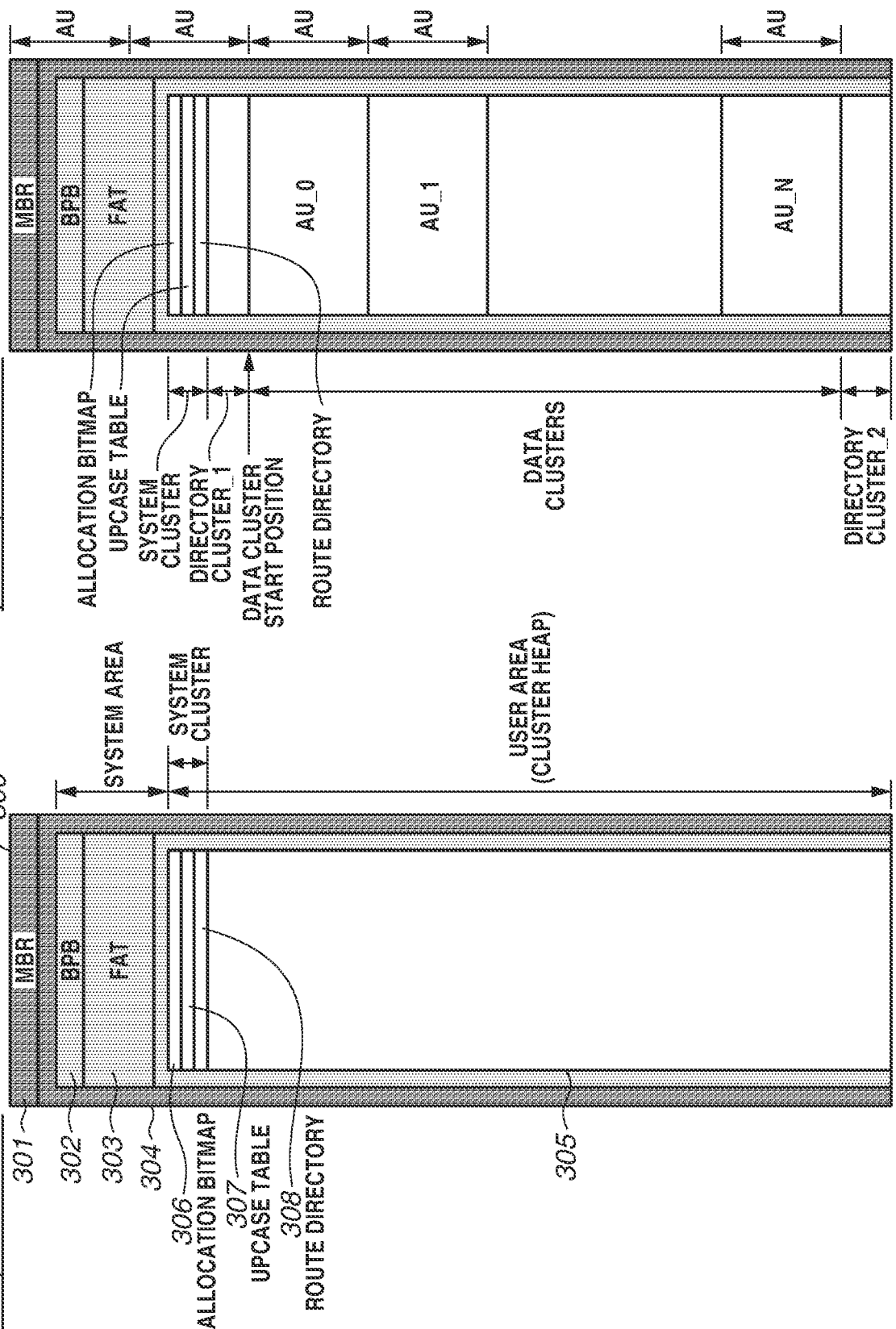
FIGS. 3A and 3B are diagrams each illustrating a configuration within a recording area of a recording medium.

FIG. 2 is a functional block diagram of executing processing based on a program read from the ROM 106 by the CPU 105 of the digital camera 100. The processing executed by the CPU 105 with the program stored in the ROM 106 includes formatting of the recording medium 109 performed by a format processing unit 201, and management of data in a formatted partition performed by a file management processing unit 202. The file management processing unit 202 includes a data cluster start position identification processing unit 203, an AU allocation table creation processing unit 204, a data cluster allocation processing unit 205, and a directory cluster allocation processing unit 206. The processing executed by these processing units may be executed by the recording medium control unit 108, instead of being executed by the CPU 105. Alternatively, the CPU 105 and recording medium control unit 108 of the digital camera 100 may share the processing. The file management processing unit 202 also includes a cluster management unit (not illustrated) that manages data recorded in a user area of the recording medium 109 for each cluster unit by writing/reading the FAT.

The processing illustrated in FIGS. 5, 8, 9, 10, and 11, which will be described below, is executed by the CPU 105 (or recording medium control unit 108). The CPU 105 reads the program stored in the ROM 106 and executes processing with the processing units illustrated in FIG. 2.

The format processing unit 201 executes format processing of the recording medium 109 by partitioning a recording area 300 on the recording medium 109 as illustrated in FIG. 3A. In the recording medium 109, a unique address (sector address) starting from an address of 0 is allocated for each minimum access unit referred to as a sector. A Master Boot Record (MBR) 301 is an area in which information about the entire recording medium 109 is recorded. The information is recorded in the zeroth sector of the recording medium 109. A Bios Parameter Block (BPB) 302 is an area in which information about an entirety of a partition 304 is recorded. The information is recorded at the head of the partition 304. A File Allocation Table (FAT) 303 is an area in which the FAT is recorded. The FAT 303 manages a cluster composed of a plurality of consecutive sectors. The partition 304 includes a system area and a user area 305. The system area is an area, which includes the BPB 302 and the FAT 303, in which management information for managing a recording area in the partition 304 is recorded. The user area (cluster heap) 305 arranged after the system area is an area for recording data and is managed by the FAT 303 for each cluster unit. Since the FAT 303 manages all clusters in the user area, the size of the FAT 303 is determined depending on the size of the user area. An Allocation Bitmap 306 and an Upcase Table 307 are recorded at the head of the user area 305, and thereafter a route directory 308 is subsequently recorded. There may be a case where the route directory 308 is recorded at the head of the user area 305 without recording the Allocation Bitmap 306 and the Upcase Table 307, depending on types and standards of the recording medium 109. The route directory 308 is an area in which the topmost directory of a directory hierarchy of the partition 304 is recorded. Each cluster is provided with an address uniquely determined for each cluster. The address allocated to each cluster is referred to as a cluster number.

Figure 4:
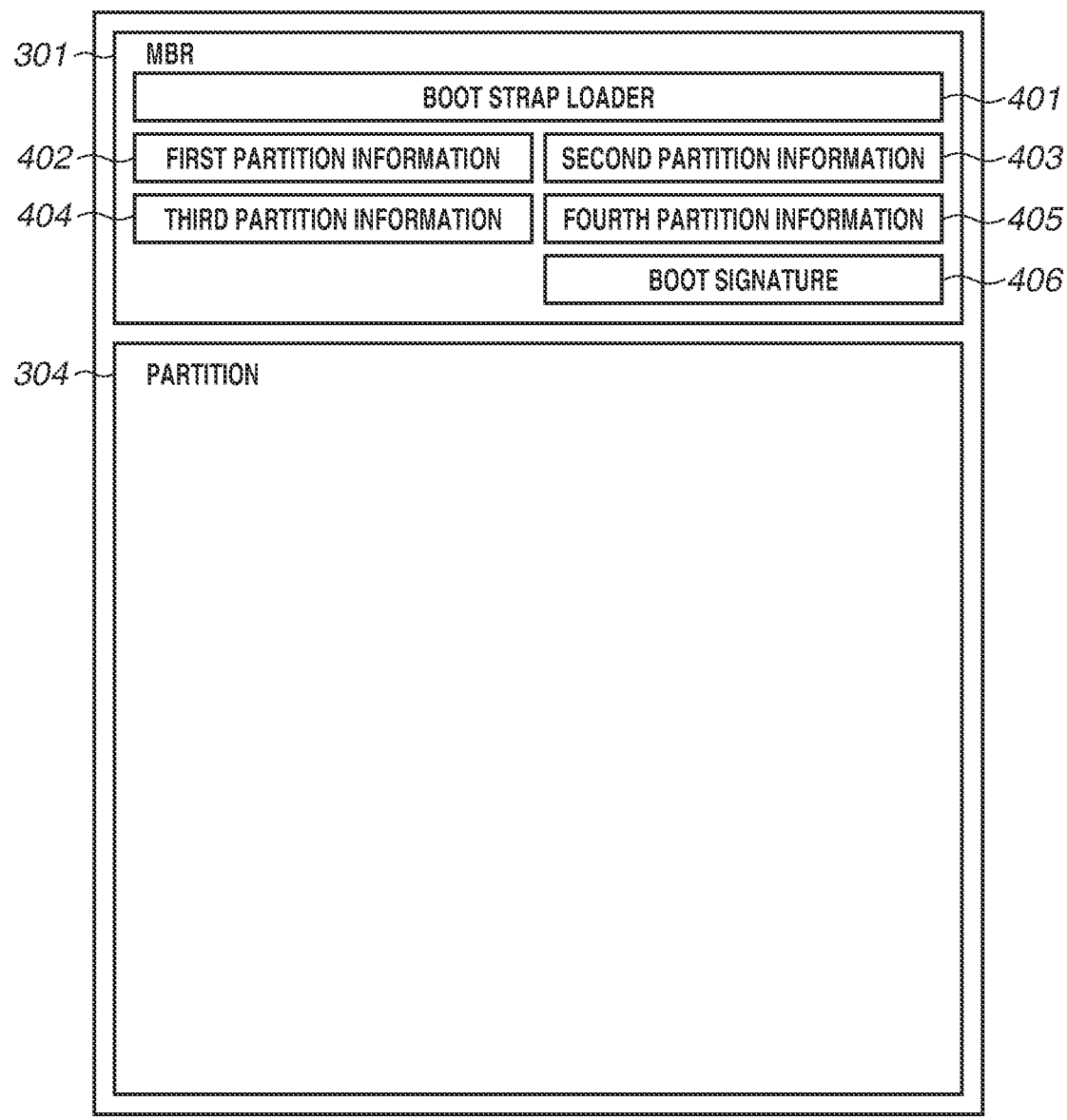
FIG. 4 is a diagram illustrating a Master Boot Record (MBR) format.

FIG. 4 is a diagram illustrating an MBR format. The MBR 301 is an architecture to manage the partition 304 in the recording medium 109. In the MBR 301, the following pieces of information are recorded: a boot strap loader 401, first partition information 402, second partition information 403, third partition information 404, fourth partition information 405, and a boot signature 406. In the partition information, a sector address from which the partition starts and a number of sectors of the partition. In a format used in a small portable recording medium, only one partition is typically used, so that information is recorded only in the first partition information 402.

Figure 5:
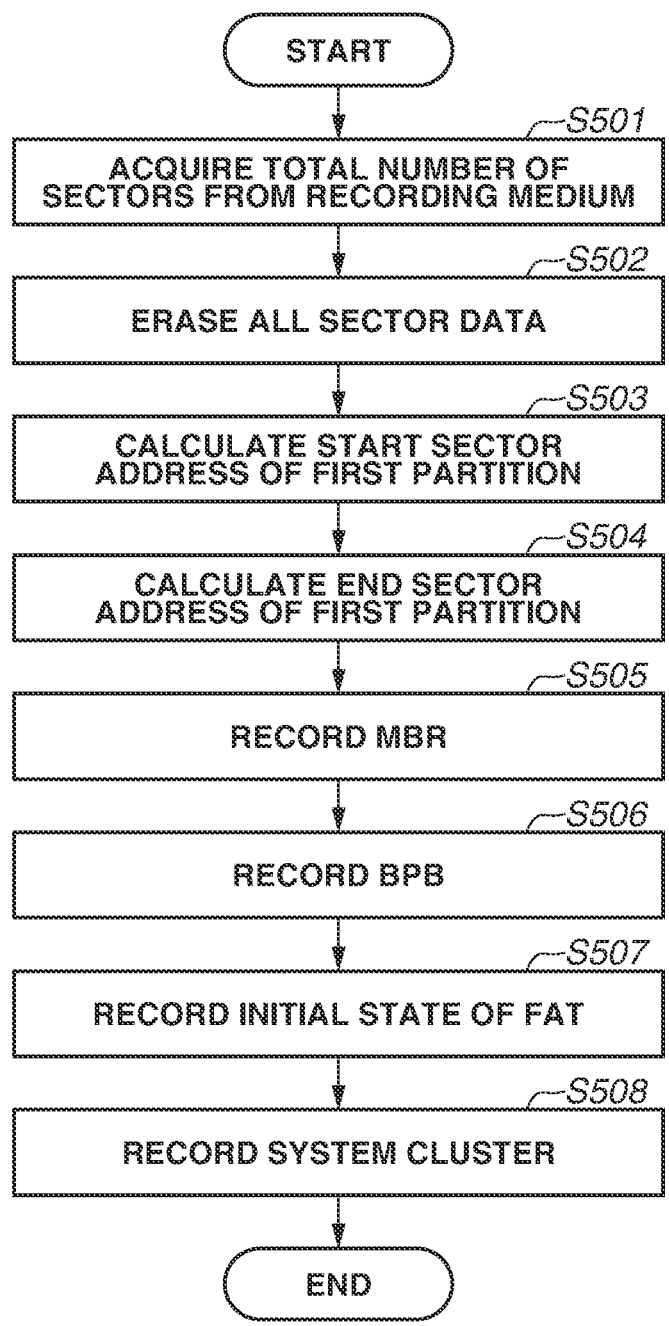
FIG. 5 is a flowchart of format processing.

A description will be given of format processing executed by the format processing unit 201 to format areas of the recording medium 109 as illustrated in FIG. 3A, with reference to a flowchart illustrated in FIG. 5. The format processing is executed by the format processing unit 201 of the CPU 105. Recording of data performed in the recording medium 109 is executed through the recording medium control unit 108. This format processing is executed in response to an execution instruction from a user through the operation unit 102.

In step S501, the format processing unit 201 acquires a total number of sectors from the recording medium 109 through the recording medium control unit 108. In step S502, the format processing unit 201 erases all sector data in the recording medium 109 through the recording medium control unit 108. In step S503, the format processing unit 201 calculates a start sector address of a first partition. The sector address of the first partition may be any address as long as an address number of the sector is one or more. To allocate many clusters to the partition, the sector address of the first partition is separated from the MBR 301 (zeroth sector) by the number of sectors used as a cluster (sectors per cluster (SPC)) in the partition. The SPC is determined based on the capacity and characteristics of the recording medium 109. For example, the SPC is determined to be 256 SPC in a case of the capacity up to 128 GB, 512 SPC in a case of the capacity up to 512 GB, and 1024 SPC in a case of the capacity up to 2 TB. In step S504, the format processing unit 201 calculates an end sector address of the first partition. The end sector address of the partition is assumed to be a final sector address of the recording medium 109. In step S505, the format processing unit 201 records the MBR 301 in the zeroth sector. In this step, the start sector address of the partition calculated in step S503, the end sector address of the partition calculated in step S504, and the number of sectors calculated from the start sector address and the end sector address are recorded in the MBR 301 as the first partition information 402. In step S506, the format processing unit 201 records the BPB 302. The format processing unit 201 records the BPB 302 from the start sector address of the first partition calculated in step S503. In step S507, the format processing unit 201 records an initial state of the FAT 303 in the first partition 304. The recording start position of the FAT 303 may be any sector address that is after an address of the BPB 302. To make many clusters available, a sector address separated from the BPB 302 by 1 SPC is set to be the recording start position of the FAT 303. The initial state of the FAT 303 will be described in detail below. In step S508, the format processing unit 201 records a system cluster. The system cluster becomes different depending on a type of the FAT. In a FAT32 file system, the route directory 308 corresponds to the system cluster. In an extended File Allocation Table (exFAT) file system, the Allocation Bitmap 306, the Upcase Table 307, and the route directory 308 correspond to the system cluster. A start sector address of the system cluster may be any location of a sector that is after the sector of the FAT having a sufficient size capable of recording the total number of clusters in the partition. To allocate many clusters, the start sector address of the system cluster is set to a sector address separated from the start sector address of the FAT 303 by 64 SPC. An area from the start sector address of the system cluster to the end sector address of the partition 304 corresponds to the user area (cluster heap) 305, which is managed for each cluster by the FAT 303.

This is the end of the format processing executed by the format processing unit 201.

A supplementary description about the FAT 303 will be given with reference to FIG. 6. The FAT file system manages clusters using the FAT 303. The clusters in the user area 305 are sequentially provided with cluster numbers starting from a second. A FAT entry uniquely corresponding to the cluster number is recorded in the FAT 303. The FAT entry indicates that a corresponding cluster is being used or being unused. In a FAT entry 601, which is a cluster being unused, 0x0 is recorded. This indicates that data can be newly allocated to this cluster. In a case of a cluster that contains data in midstream among clusters being used, a cluster number of a cluster in which the next data is recorded is recorded in a FAT entry 602. In a case of a cluster containing an end of data among clusters being used, a value indicating the end is recorded in a FAT entry 603. While denoted as END in FIG. 6 for explanation, 0xFFFFFFFF is recorded as a value indicating the end in a case of the FAT32 file system and the exFAT file system. In step S507 of the format processing, the initial state of the FAT is recorded. The initial state of the FAT is a state where 0xFFFFFFF8 is recorded in a FAT reservation entry 604, and 0x0 is recorded in each of clusters except for the system cluster to be recorded in step S508. In step S508, the value indicating the end is recorded in a FAT entry 605 corresponding to the system cluster.

Figure 7:
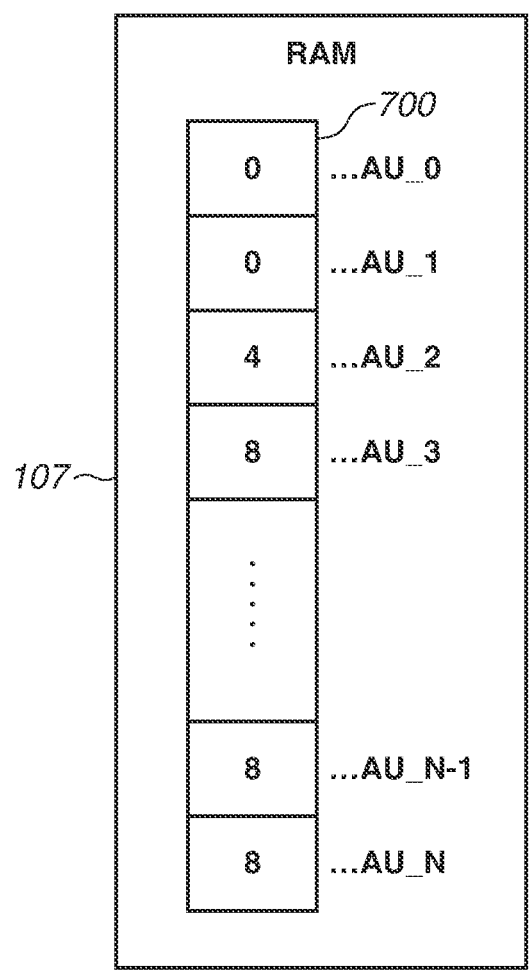
FIG. 7 is an Allocation Unit (AU) allocation table.

The file management processing unit 202 includes the AU allocation table creation processing unit 204 and the data cluster allocation processing unit 205 to allocate (determine) data clusters for recording data at the time of recording data such as moving images in the writing speed guarantee mode. The AU allocation table creation processing unit 204 allocates each cluster to an AU so that a plurality (predetermined number) of consecutive clusters constitutes the AU. The number of clusters constituting one AU is determined depending on an AU size and a cluster size. The AU allocation table creation processing unit 204 creates an AU allocation table 700 as illustrated in FIG. 7 to allocate the plurality (predetermined number) of clusters to the AU. The data cluster allocation processing unit 205 uses the AU allocation table 700 to determine the data clusters. The AU allocation table 700 is a table organizing information in the FAT 303 on an AU-by-AU basis. The AU allocation table 700 is generated by the AU allocation table creation processing unit 204 on the RAM 107. The number of free clusters is recorded on the AU-by-AU basis in the AU allocation table 700. In a case where a value of the AU allocation table is 0, this indicates that the corresponding AU contains no free cluster. In a case where a value of the AU allocation table is 8, this indicates that the AU contains eight free clusters. If eight clusters constitute one AU, it indicates that all the eight clusters are free clusters. At the time of recording real-time data, such as moving images, in the writing speed guarantee mode, the data cluster allocation processing unit 205 determines the clusters for data in which data is recorded so that the data is recorded in clusters contained in an AU, an entirety of which is free, as described above.

In a case of creating the AU allocation table 700, it is necessary to identify a start cluster number of clusters to be managed by the AU allocation table 700. This start cluster number is a start position of clusters that can be used as the data clusters. The data cluster start position identification processing unit 203 of the file management processing unit 202 executes data cluster start position identification processing to identify the start position of clusters that can be used as the data clusters. Thereafter, the AU allocation table creation processing unit 204 executes AU allocation table creation processing. Each of the data cluster start position identification processing and the AU allocation table creation processing is executed when the digital camera 100 is powered on or when initialization processing for using the recording medium 109 is executed. The initialization processing is executed when the recording medium 109 is mounted on the digital camera 100.

Figure 8:
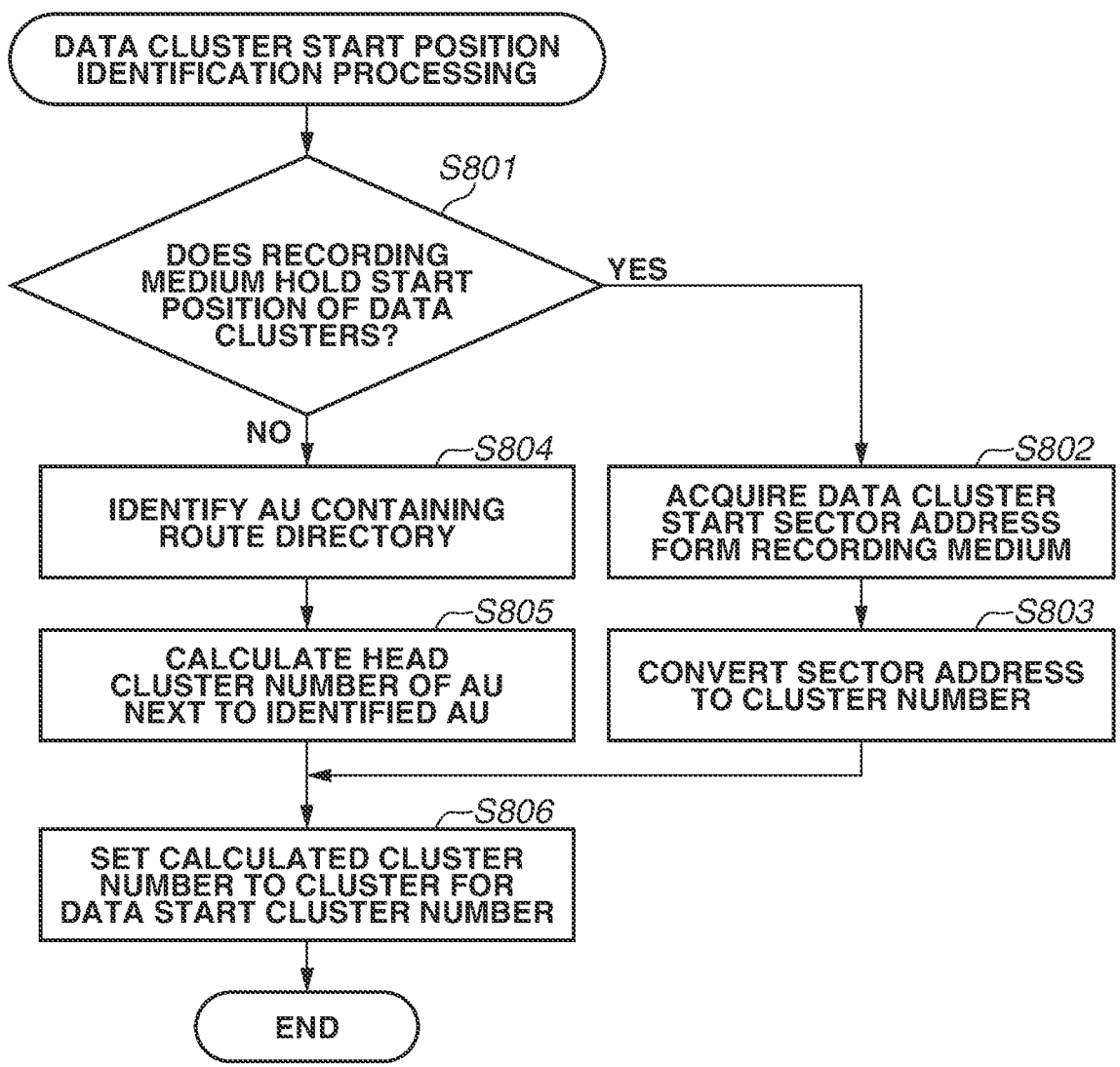
FIG. 8 is a flowchart of data cluster start position identification processing.

First, a description will be given of the data cluster start position identification processing executed by the data cluster start position identification processing unit 203 with reference to a flowchart illustrated in FIG. 8.

In step S801, the data cluster start position identification processing unit 203 checks whether the recording medium 109 holds the start position of the data cluster. The recording medium 109, depending on a type of the recording medium 109, holds a sector address of the start position of the data cluster. If the recording medium 109 holds the start position of the data cluster (YES in step S801), the processing proceeds to step S802. In step S802, the data cluster start position identification processing unit 203 acquires a data cluster start sector address from the recording medium 109. In step S803, the data cluster start position identification processing unit 203 converts the data cluster start sector address acquired in step S802 to a cluster number, and the processing proceeds to step S806. On the other hand, if the recording medium 109 does not hold the start position of the data cluster (NO in step S801), the processing proceeds to step S804. In step S804, the data cluster start position identification processing unit 203 identifies an AU that contains the system cluster, such as the route directory 308. In this step, the data cluster start position identification processing unit 203 partitions AUs at an interval of the AU size in order from the zeroth sector of the recording medium 109 to identify an AU that contains the system cluster. Since the AU corresponds to a block and blocks are partitioned at an interval of a block size from the zeroth sector, the data cluster start position identification processing unit 203 partitions the AUs at the interval of the AU size from the zeroth sector. In step S805, the data cluster start position identification processing unit 203 calculates a head cluster number of an AU next to the AU that contains the system cluster identified in step S804. After the head cluster number is calculated, the processing proceeds to step S806. In step S806, the data cluster start position identification processing unit 203 sets the cluster number identified in step S803 or S805 to a data cluster start cluster number.

The start position of the data cluster identified in the data cluster start position identification processing is used in the AU allocation table creation processing executed thereafter and determination processing of a cluster number corresponding to an AU. Thus, the start position (start cluster number) of the data clusters may be stored in the RAM 107.

Figure 9:
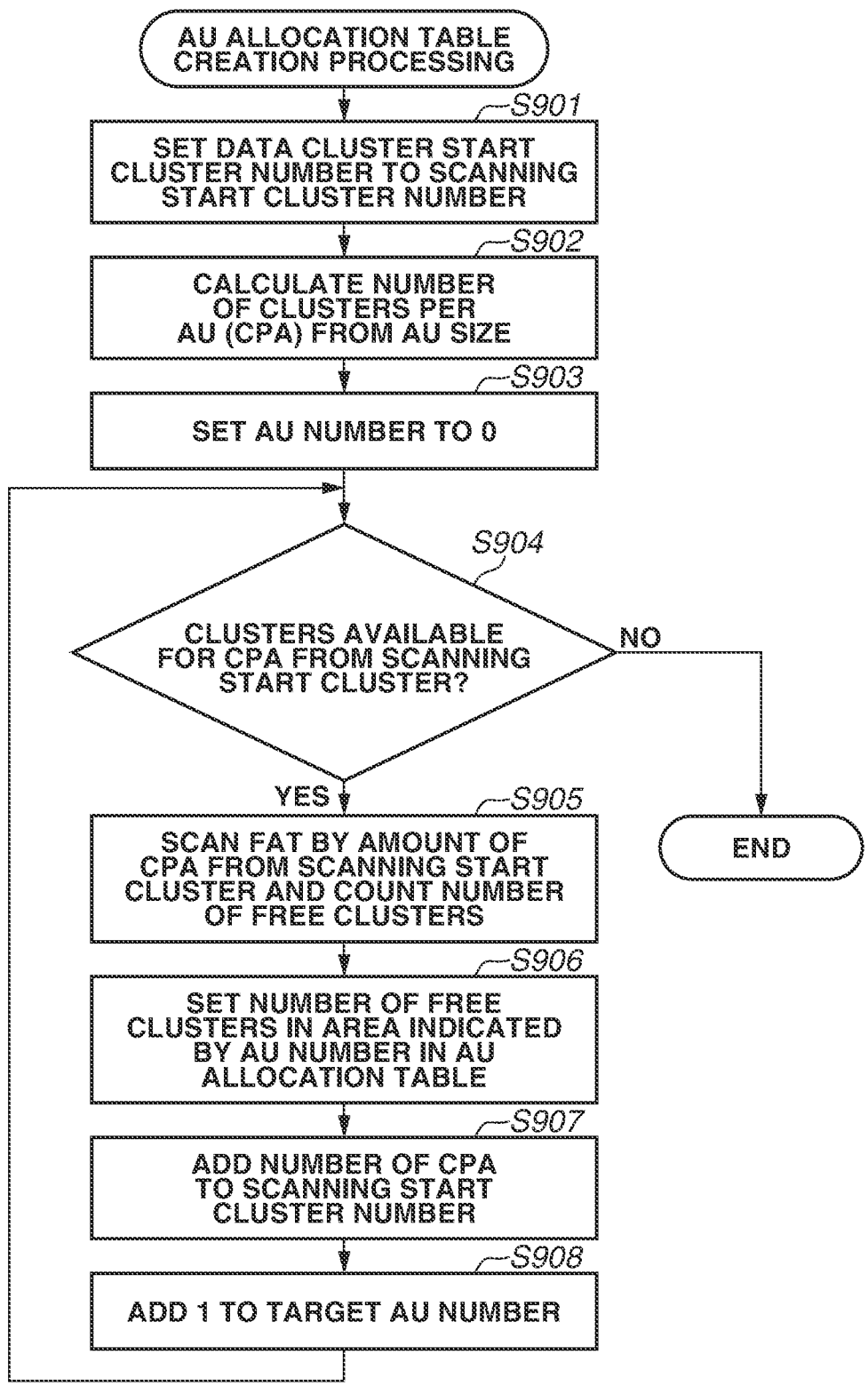
FIG. 9 is a flowchart of AU allocation table creation processing.
Figure 10:
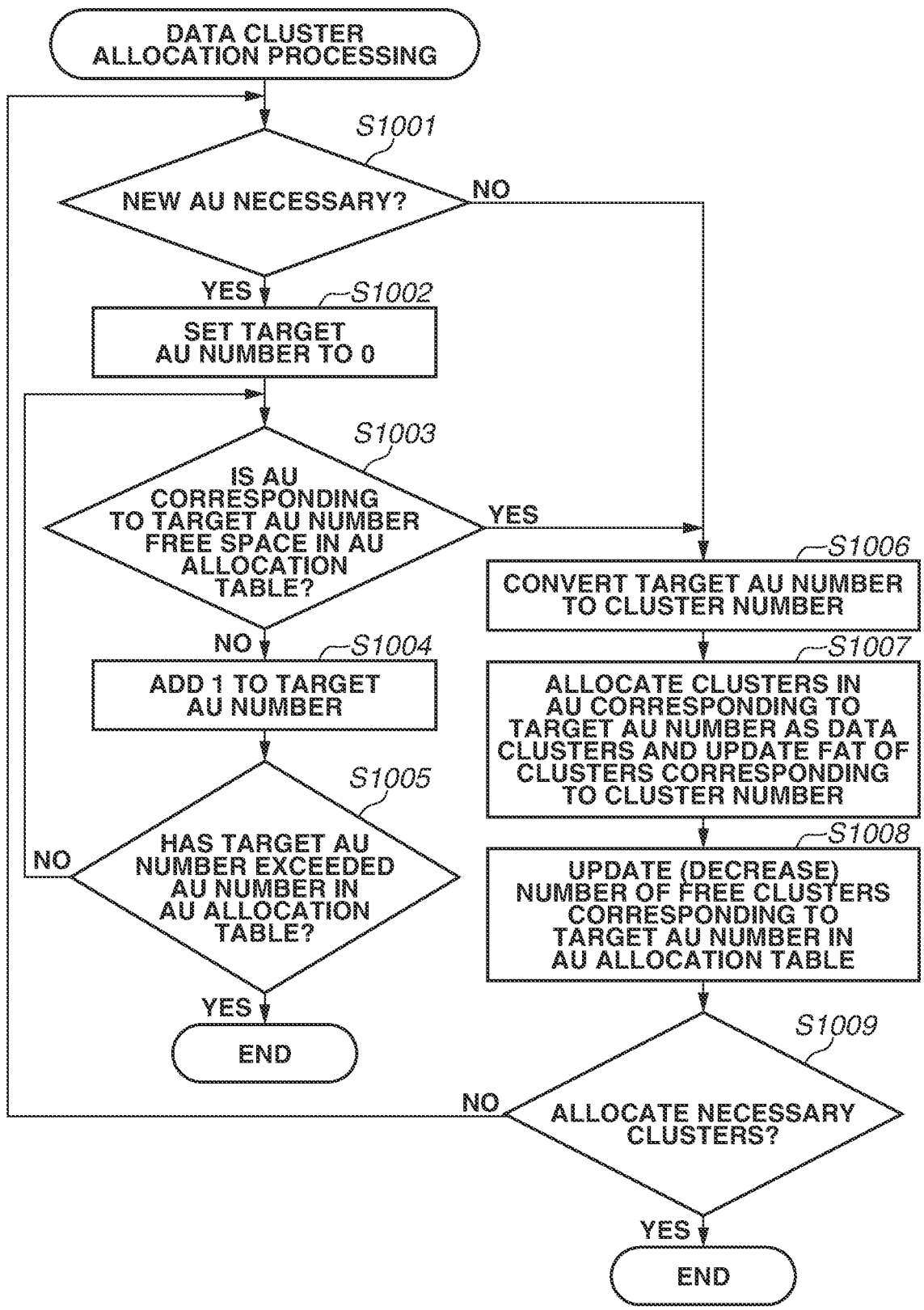
FIG. 10 is a flowchart of data cluster allocation processing.
Figure 11:
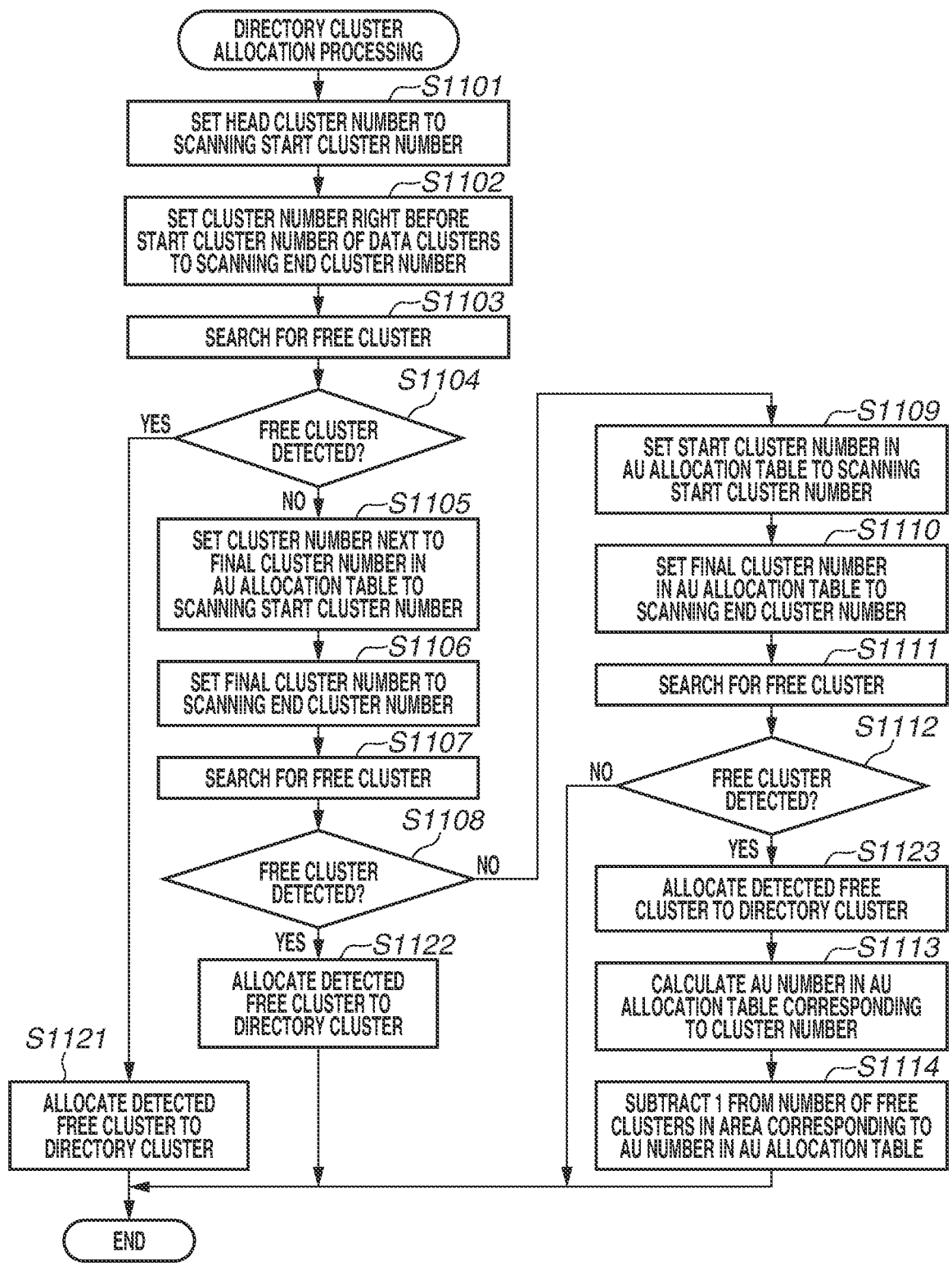
FIG. 11 is a flowchart of directory cluster allocation processing.

A description will be given of the AU allocation table creation processing executed by the AU allocation table creation processing unit 204 with reference to a flowchart illustrated in FIG. 9. In the AU allocation table creation processing, the AU allocation table indicating a recording state of clusters on the AU-by-AU basis is created on the RAM 107, based on the FAT 303 in the recording medium 109.

In step S901, the AU allocation table creation processing unit 204 sets the start cluster number identified in the data cluster start position identification processing to a FAT scanning start cluster number. In step S902, the AU allocation table creation processing unit 204 calculates a number of clusters in the AU (clusters per AU (CPA), which is a number of clusters per AU. The AU allocation table creation processing unit 204 calculates the number of clusters in the AU (CPA) from the AU size and the cluster size. The AU size is acquired from the recording medium 109 through the recording medium control unit 108. The cluster size corresponds to the SPC that is determined depending on the capacity and characteristics of the recording medium 109. In step S903, the AU allocation table creation processing unit 204 sets an AU number serving as a processing target of the AU allocation table creation processing to zero. In step S904, the AU allocation table creation processing unit 204 checks whether clusters starting from a FAT scanning start cluster are available for the CPA. If the clusters are not available for the CPA, i.e., the number of clusters from the FAT scanning start cluster to the end of the partition is not enough for the CPA (NO in step S904), the AU allocation table creation processing ends. If there are not enough clusters for the CPA, the clusters cannot constitute the AU, and thus the tail end of the partition is an area in which data cannot be written in the writing speed guarantee mode. If there are enough clusters for the CPA from the FAT scanning start cluster (YES in step S904), the processing proceeds to step S905. In step S905, the AU allocation table creation processing unit 204 scans the FAT by an amount of the CPA from the FAT scanning start cluster, and calculates the number of free clusters. In step S906, the AU allocation table creation processing unit 204 records the number of free clusters calculated in step S905 in an area on the RAM 107. The area corresponds to the AU number in the AU allocation table. Clusters corresponding to a CPA cluster size, which start from the FAT scanning start cluster, become the AU managed with the currently set AU number. Thus, the AU allocation table creation processing unit 204 scans free clusters in the AU and records a result in the AU allocation table in the RAM 107. In step S907, the AU allocation table creation processing unit 204 adds the CPA cluster size to the FAT scanning start cluster number so that the cluster number of a cluster next to the cluster recorded as a free cluster in the AU allocation table becomes the FAT scanning start cluster number. In step S908, the AU allocation table creation processing unit 204 adds one to the AU number, and the processing in and after step S904 is repeated. By repeating the processing, the AU allocation table creation processing unit 204 partitions clusters, ranging from the cluster having the start cluster number identified in the cluster data start position identification processing to the cluster at the end of the partition, at an interval of the AU having the number of clusters corresponding to the CPA, and provides a corresponding AU number to the AU. The AU allocation table creation processing unit 204 creates the AU allocation table 700 that indicates the number of free clusters with respect to each AU provided with the corresponding AU number. In the AU allocation table, the AU number is allocated from the zeroth. The AU number in the AU allocation table 700 is also used for calculation of the start cluster number of the corresponding AU. A value obtained by multiplying the AU number by the CPA and adding the start cluster number of the data clusters thereto is the start cluster number of the AU number. The AU allocation table 700 created in this manner is used as information for allocating clusters by the data cluster allocation processing unit 205 at the time of recording in the writing speed guarantee mode.

When real-time data such as moving images is recorded on the recording medium 109 in the writing speed guarantee mode, the CPU 105 causes the data cluster allocation processing unit 205 to execute the data cluster allocation processing and secure clusters in which the data is recorded. The data cluster allocation processing unit 205 uses the AU allocation table 700 to allocate the data clusters. A description will be given of the data cluster allocation processing executed by the data cluster allocation processing unit 205 with reference to a flowchart illustrated in FIG. 10. In this processing, a plurality of clusters are allocated depending on the size of data to be written. At a time of recording real-time data such as a moving image, recording target data is typically stored in the RAM 107 and written in the recording medium 109 in units of a predetermined size. The writing of data having the predetermined size is repeated until the recording of the recording target data is completed to be recorded as one data file (moving image file). Thus, the data cluster allocation processing is also repeated from the start of the recording of the data until the completion of the recording of the data as one data file.

In steps S1001, the data cluster allocation processing unit 205 checks whether a new AU is necessary as a recording target area. During a recording of one identical file data, a cluster can be allocated from some midpoint of an AU. In this case, a result in step S1001 is NO. In contrast, when data is recorded as a new file, or after all clusters in the AU are allocated as the data clusters, a new AU area is necessary. Thus, a result in step S1001 becomes YES. When the new AU is necessary (YES in step 1001), the processing proceeds to step S1002. When the new AU is not necessary (NO in step 1001), the processing proceeds to step S1006. In step S1002, the data cluster allocation processing unit 205 sets an AU number serving as the processing target (target AU number) to zero. This setting is made to search the AU allocation table from the head toward the trail end of the AU allocation table for a free space. In step S1003, the data cluster allocation processing unit 205 checks the number of free clusters recorded in an area corresponding to the target AU number in the AU allocation table 700, and checks the AU is a free space (all clusters are free spaces). If the number of free clusters recorded in the area corresponding to the target AU number is the CPA, the data cluster allocation processing unit 205 determines that an AU corresponding to the target AU number is a free space. If the AU corresponding to the target AU number is a free space (YES in step S1003), the processing proceeds to step S1006. If the AU is not a free space and at least one cluster thereof is used (NO in step S1003), the processing proceeds to step S1004. In step S1004, the data cluster allocation processing unit 205 adds one to the AU number, and causes the next AU number to serve as the processing target. In step S1005, the data cluster allocation processing unit 205 checks whether the AU number, which has become to serve as the processing target, has exceeded the AU number managed by the AU allocation table. If the target AU number has exceeded the AU number managed by the AU allocation table (YES in step S1005), it is understood that an AU corresponding the AU number does not exist. Consequently, no AU in which data can be recorded in the writing speed guarantee mode exits and no cluster can be allocated to the data clusters, and thus the data cluster allocation processing ends. In this case, the clusters necessary for the writing of data cannot be allocated, resulting in failure in recording of the data. If the target AU number has not exceeded the AU number managed by the AU allocation table and the target AU number is the AU number managed (recorded) by the AU allocation table (NO in step S1005), the processing proceeds to step S1003. In step S1006, the data cluster allocation processing unit 205 converts the target AU number to the cluster number using the calculation method described above. In step S1007, the data cluster allocation processing unit 205 refers to the FAT 303 to allocate clusters in the AU corresponding to the target AU number as the data clusters, and updates the FAT 303 of each of the clusters allocated as the data clusters. When the clusters in the AU corresponding to the target AU number are allocated as the data clusters, free clusters in the AU are allocated as the data clusters in ascending order from a cluster having a small cluster number. The number of clusters allocated as the data clusters is determined by comparing a number of free clusters in the area corresponding to the AU number in the AU allocation table and a cluster number corresponding to the size of data to be recorded, and adopting the smaller cluster number from the comparison result. In step S1008, the data cluster allocation processing unit 205 updates the AU allocation table 700 by recording a value obtained by subtracting the number of clusters allocated as the data clusters in step S1007 from the number of free clusters recorded in the area corresponding to the AU number in the AU allocation table 700. In step S1009, the data cluster allocation processing unit 205 checks whether the clusters necessary for the writing of data have been allocated, i.e., the data clusters have been allocated with respect to all the data to be recorded in the current recording in the writing speed guarantee mode. If the clusters necessary for the writing of data have been allocated (YES in step S1009), the data cluster allocation processing executed by the data cluster allocation processing unit 205 ends. If all the clusters necessary for the writing of data have not yet been allocated (NO in step S1009), the data cluster allocation processing needs to be executed again, and thus the processing returns back to step S1001 to allocate the data clusters for the next recording target.

The data cluster allocation processing described above allocates the data clusters to data to be recorded, thereby allowing allocation of the area in which the entire AU is a free space that contains only free clusters. When no free space as the AU exits even if free clusters exist on the recording medium 109, it is determined that no recordable cluster exists. In this way, the clusters managed by the AU allocation table as the AU, out of the user area of the recording medium 109, can be allocated as the data clusters. That is, the range denoted as the data clusters illustrated in FIG. 3B is a range that can be allocated as the data clusters. In other words, the entire recording area of the recording medium 109 is partitioned at the interval of the AU size from the zeroth sector. An area from the start position of the data clusters, which is the start position of an AU next to the AU that contains the system cluster (route directory), to the final cluster of the final AU (AU N) in the partition 304 is the area that can be allocated as the data clusters.

After allocating the data clusters using the data cluster allocation processing, the CPU 105 executes processing of recording the recording target data in the clusters allocated as the data clusters through the recording medium control unit 108.

When newly creating a directory (creating a file or a folder) on the recording medium 109, the directory cluster allocation processing unit 206 secures a directory cluster for recording the directory. A description will be given of the directory cluster allocation processing executed by the directory cluster allocation processing unit 206 of the CPU 105 with reference to a flowchart illustrated in FIG. 11. The directory cluster allocation processing allocates one cluster to each directory as the directory cluster. The directory cluster allocation processing unit 206 basically allocates a cluster that is not managed by the AU allocation table as the directory cluster. Basically, only a cluster not under the management of the AU allocation table is sufficient for the directory cluster. However, should all clusters that is not managed by the AU allocation table run out in allocation of the directory cluster, a free cluster in the AU allocation table can be allocated as the directory cluster according to the present exemplary embodiment.

In step S1101, the directory cluster allocation processing unit 206 sets the head cluster number to the FAT scanning start cluster number. As described above, the clusters are sequentially provided with the cluster numbers starting from the second, and thus the FAT scanning start cluster number is set to the second. In step S1102, the directory cluster allocation processing unit 206 sets a cluster number that is one cluster number before the start cluster number of the AU allocation table to a FAT scanning end cluster number. The start cluster number of the AU allocation table is the start cluster number identified by the data cluster start position identification processing, so that the cluster number that is one cluster number before the start cluster number is set to the FAT scanning end cluster number. In step S1103, the directory cluster allocation processing unit 206 searches clusters on the FAT 303 from the FAT scanning start cluster number set in step S1101 and the FAT scanning end cluster number set in step S1102 for a free cluster. In step S1104, the directory cluster allocation processing unit 206 checks whether a free cluster has been detected in the processing performed in step S1103. If there is the free cluster (YES in step S1104), the processing proceeds to step S1121.

In step S1121, the directory cluster allocation processing unit 206 allocates the free cluster detected in step S1103 as the directory cluster. Then the cluster for directory allocation processing ends. In step S1121, the directory cluster is allocated in an area denoted in FIG. 3B as a directory cluster_1 outside the area of the data clusters managed by the AU allocation table. The directory cluster_1 is an area ranging from a cluster next to the system cluster to a cluster serving as a border with an AU next to the current AU. Since this area cannot be used as the data clusters, using this area as the directory clusters allows effective utilization of free clusters.

If there is no free cluster among clusters from the FAT scanning start cluster number to the FAT scanning end cluster number (NO in step S1104), the processing proceeds to step S1105.

In step S1105, the directory cluster allocation processing unit 206 sets a cluster number next to the final cluster number in the AU allocation table (final cluster number in final AU number) to the FAT scanning start cluster number. In step S1106, the directory cluster allocation processing unit 206 sets the final cluster number of the user area 305 to the FAT scanning end cluster number. In step S1107, the directory cluster allocation processing unit 206 searches clusters with reference to the FAT 303 from the FAT scanning start cluster number set in step S1105 and the FAT scanning end cluster number set in step S1106 for a free cluster. In step S1108, the directory cluster allocation processing unit 206 checks whether a free cluster has been detected in the processing in step S1007. When there is a free cluster (YES in step S1108), the processing proceeds to step S1122.

In step S1122, the directory cluster allocation processing unit 206 allocates the free cluster detected in step S1107 as the directory cluster. Then the directory cluster allocation processing ends. In step S1122, an area in which the directory cluster is allocated is an area denoted in FIG. 3B as a directory cluster_2 outside the area of the data clusters managed by the AU allocation table. The area of the directory cluster_2 is the trail end area that is less than the AU size (the number of clusters is less than CPA) when the recording area of the recording medium 109 is partitioned at the interval of the AU size (CPA). When the recording area is used by being partitioned into a plurality of partitions, the partitioning can be performed such that the final cluster in the AU allocation table corresponds to the final cluster in the user area. Even so, however, such an area that is less than the AU cluster number occurs in the tail end area of the recording area of the recording medium 109. Since there is one partition in the format processing of the recording medium 109 according to the present exemplary embodiment, the tail end area of the recording medium 109 is less than the AU size and thus cannot constitute the AU, whereby a cluster that cannot be used as the data clusters occurs. According to the present exemplary embodiment, using the area, which cannot be used as the AU at the tail end of the recording medium 109, as the directory cluster allows effective utilization of free clusters that would have usually been left unused.

If there is no free cluster (NO in step S1108), the processing proceeds to step S1109.

In step S1109, the directory cluster allocation processing unit 206 sets the start cluster number in the AU allocation table to the FAT scanning start cluster number. In step S1110, the directory cluster allocation processing unit 206 sets the final cluster number in the AU allocation table to the FAT scanning end cluster number. In step S1111, the directory cluster allocation processing unit 206 searches clusters from the FAT scanning start cluster number set in step S1109 and the FAT scanning end cluster number set in step S1110 for a free cluster. In step S1112, the directory cluster allocation processing unit 206 checks whether the free cluster has been detected in the processing in step S1111. If there is a free cluster (YES in step S1112), the processing proceeds to step S1123.

In step S1123, the directory cluster allocation processing unit 206 allocates the free cluster detected in step S1111 as the directory cluster. Then the processing proceeds to step S1113. The directory cluster allocation processing unit 206 may search for a free cluster and allocate a cluster that is found first to the directory cluster. However, if a cluster in a free AU is used, the AU cannot be used for recording data in Speed Class. Thus, control may be performed such that an unused free cluster in an AU in which part of clusters is used is preferentially allocated as the directory cluster, and a cluster in a free AU, an entirety of which is unused, is not allocated as the directory cluster. However, if the free cluster only exits in the free AU, control is performed such that the cluster in the free AU is allocated as the directory cluster. In step S1113, the directory cluster allocation processing unit 206 converts a cluster number of the detected free cluster to an AU number in the AU allocation table. As a result of the conversion, the AU number is a quotient of division of a value, which is obtained by subtracting the start cluster number of the data clusters from the cluster number, by the CPA. In step S1114, the directory cluster allocation processing unit 206 updates the AU allocation table with a value obtained by subtracting one from the number of free clusters recorded in the area in the AU allocation table corresponding to the AU number calculated in step S1113. Since the directory is recorded in one cluster, one cluster is allocated as the directory cluster in step S1123. Thus, one is subtracted from the number of free clusters.

If there is no free cluster in step S1112 (NO in step S1112), the directory cluster allocation processing ends. In this case, no free cluster exits on the recording medium 109, and thus the directory cluster cannot be allocated.

With this processing described above, the directory cluster allocation processing unit 206 allocates the directory cluster to the directory to be recorded. After the directory cluster allocation processing unit 206 allocates the directory cluster, the CPU 105 executes processing of recording a recording target directory in the cluster allocated as the directory cluster through the recording medium control unit 108.

In the processing described above, should all free clusters that is not managed by the AU allocation table run out, a cluster managed by the AU allocation table is allocated as the directory cluster. However, if only a cluster that is not managed by the AU allocation table is sufficient for the directory cluster depending on the configuration, format, and the like of the recording medium 109, only the cluster not managed by the AU allocation table may be allocated as the directory cluster.

As described above, the present exemplary embodiment causes an area that is inappropriate for recording real-time data in terms of a format to serve as an area for directory, thereby enabling recording of data without decreasing capacity efficiency of the recording medium 109.

In the description above, the number of free clusters in an AU determined to a free space is equal to the CPA, in the data cluster allocation processing described above. This is a case where real-time data such as moving images is recorded in the writing speed guarantee mode. In a case of recording still images or management data, the data cluster may be allocated when there is a free space of a size less than the CPA and equal to or larger than one cluster.

In the present exemplary embodiment, the CPU 105 manages the data clusters in the user area in the AU, which is the recording unit of recording data in the writing speed guarantee mode. The present exemplary embodiment thus enables the recording of data only in a free AU in the writing speed guarantee mode. However, as long as the recording of data is managed in a recording unit of a region corresponding to the block of the recording medium, a recording unit other than the AU may be used to manage the recording of data.

While the MBR is used as the standard of managing the partition in the first exemplary embodiment, the maximum number of sectors that can be handled by the MBR is 0xFFFFFFFF. In this case, if a sector size is 512 bytes, the maximum capacity becomes 2 terabytes. To use the recording medium 109 having a number of sectors larger than this number of sectors, it is necessary to have a partition in a GUID Partition Table (GPT) format instead of the MBR.

A digital camera 100 including a recording apparatus, which uses the GPT format, according to a second exemplary embodiment will be described with reference to FIGS. 12 and 13.

In the second exemplary embodiment, the following units according to the first exemplary embodiment can be used as they are: the data cluster start position identification processing unit 203, the AU allocation table creation processing unit 204, the data cluster allocation processing unit 205, and the directory cluster allocation processing unit 206.

The GPT is an architecture to manage the partition 304 in the recording medium 109. The configuration of the GPT will be described with reference to FIG. 12. The GPT is composed of a Protective MBR (PMBR) 1201, a Primary GPT header 1202, a GPT Entry Array 1203, a Backup GPT Entry Array 1204, and a Backup GPT Header 1205.

As a countermeasure against data corruption, contents of the Primary GPT header 1202 and the GPT Entry Array 1203 are stored as a backup in the Backup GPT Header 1205 and the Backup GPT Entry Array 1204, respectively. In a case where a value of a cyclic redundancy check (CRC) included in the Primary GPT header 1202 is different from a value calculated from a recorded value, original data can be recovered from the backup contents. Backup data in the Backup GPT Header 1205 or the Backup GPT Entry Array 1204 is typically recorded at the tail end of the recording medium 109.

The PMBR 1201 is an area for a device that supports only the MBR, and is recorded in the zeroth sector. From the device that supports only the MBR, the entire recording medium 109 appears as one partition. With respect to a device that supports the GPT, information (described below) indicating a sector address (typically a first sector) of the Primary GPT header 1202 is recorded.

In the Primary GPT header 1202, the following information is recorded: a signature, a revision number, a header CRC 32, a sector address in which the Primary GPT header 1202 itself is recorded, a sector address of the Backup GPT Header 1205, a start sector address of the GPT Entry Array 1203, and a number of partitions. The number of partitions typically corresponds to 128 entries.

In the GPT Entry Array 1203, information about partitions, the number of which is described in the Primary GPT header 1202, is recorded. As the information about each partition, a start sector address of a partition, an end sector address of the partition, and the like are recorded. In a case where the recording medium 109 is a portable recording medium, only one partition is typically used, so that information is recorded only in first partition information 1206.

Figure 12:
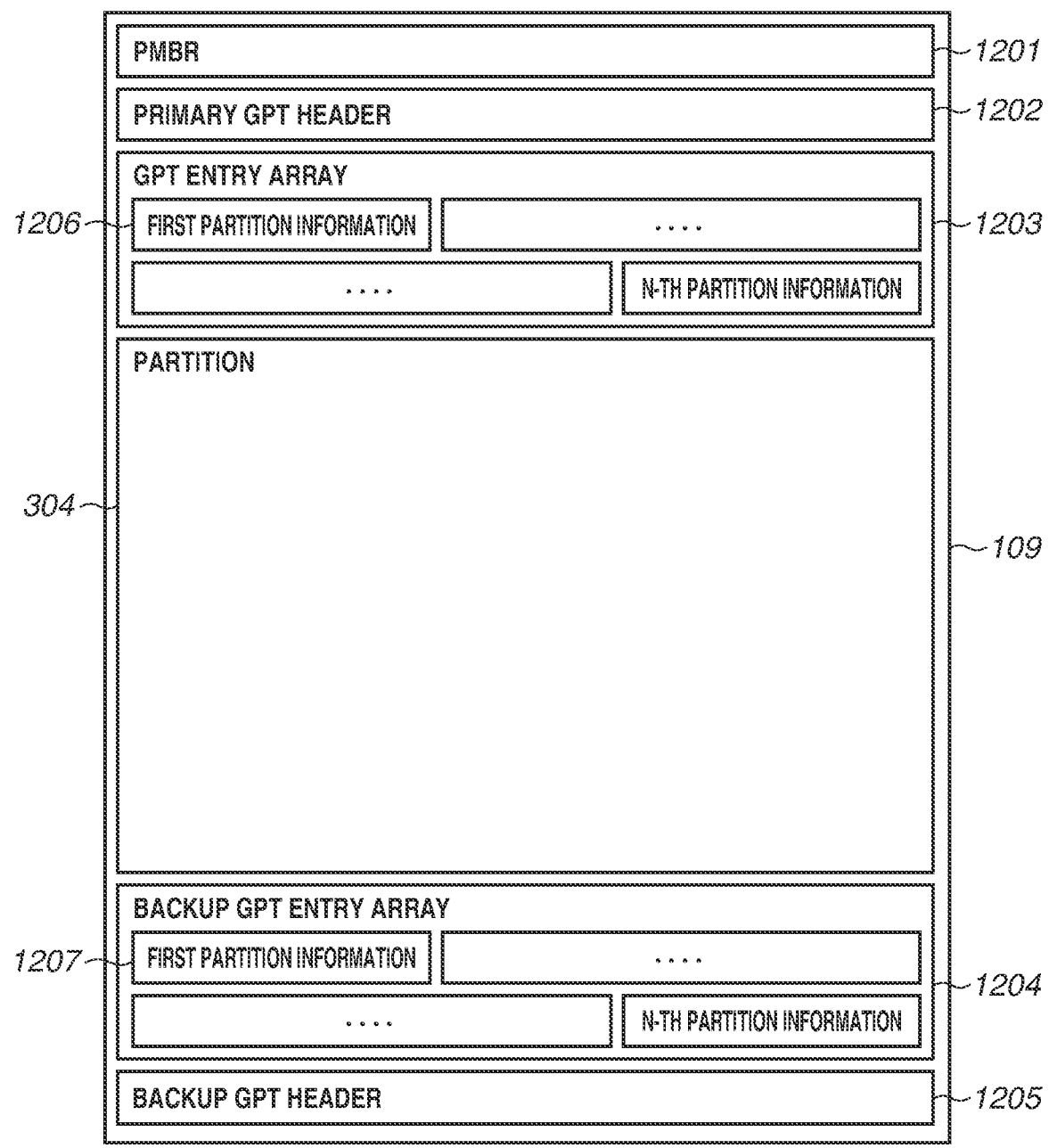
FIG. 12 is a diagram illustrating a GUID Partition Table (GPT) format.
Figure 13:
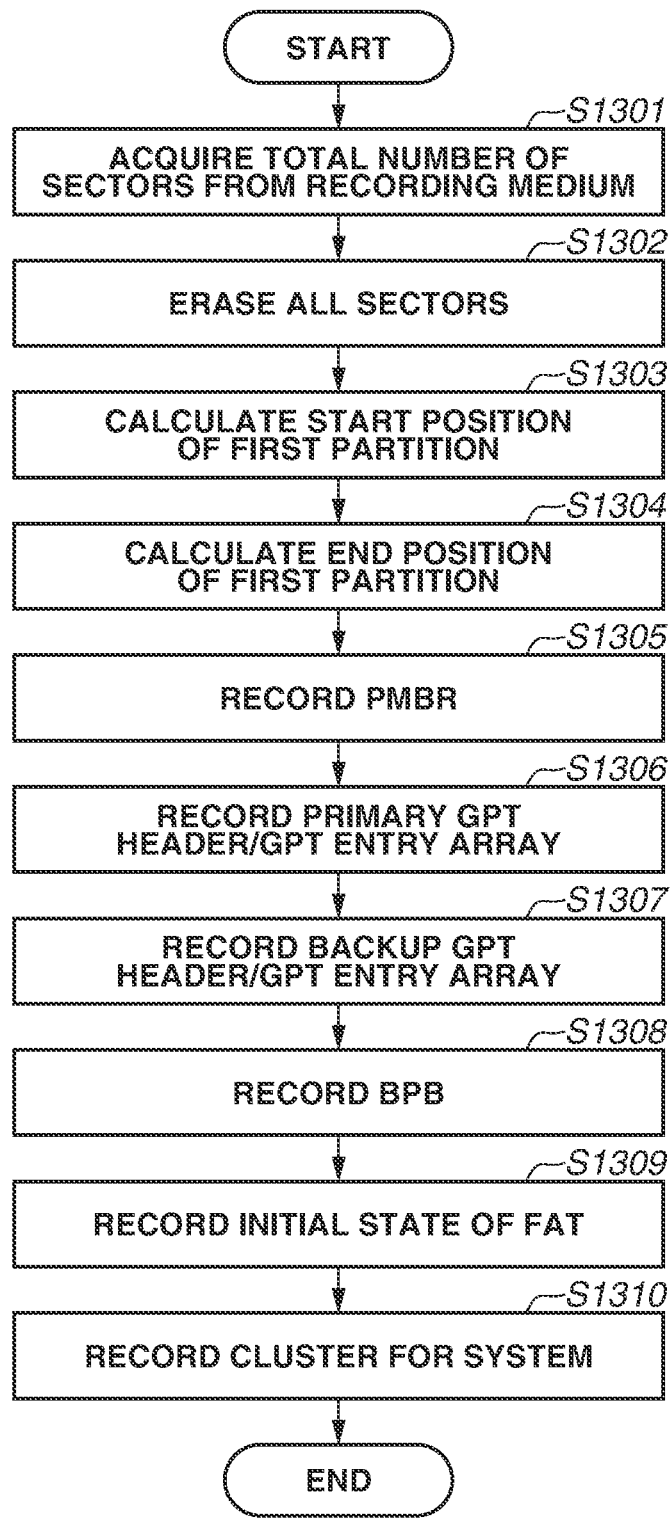
FIG. 13 is a flowchart of format processing in the GPT format.

A description will be given of processing executed by the format processing unit 201 to format areas of the recording medium 109 as illustrated in FIG. 12 with reference to a flowchart illustrated in FIG. 13.

In step S1301, the format processing unit 201 acquires a total number of sectors from the recording medium 109. In step S1302, the format processing unit 201 erases data in all the sectors. In step S1303, the format processing unit 201 calculates a sector address of the first partition. The sector address of the first partition may be anywhere from the first sector or after. To allocate many sectors to the partition, assume that the sector address is separated from the zeroth sector by the number of sectors to be used as a cluster (SPC). In step S1304, the format processing unit 201 calculates the end sector address of the first partition. The end sector address of the partition is a sector address calculated by subtracting the number of the SPC from the final sector address of the recording medium 109. An area from the end sector address of the partition to the final sector address of the recording medium 109 corresponds to an area in which the Backup GPT Header 1205 and the Backup GPT Entry Array 1204 are recorded. In step S1305, the format processing unit 201 records the PMBR 1201. The PMBR 1201 is created so as to indicate that the Primary GPT header 1202 is recorded from the first sector. In step S1306, the format processing unit 201 creates the Primary GPT header 1202 and the GPT Entry Array 1203. The Primary GPT header 1202 and the GPT Entry Array 1203 are created so as to indicate that the Primary GPT header 1202 is recorded in the second sector, and the GPT Entry Array 1203 starts from the third sector, respectively. The Backup GPT Header 1205 is created so as to indicate that the Backup GPT Header 1205 is recorded in the final sector address of the recording medium 109. The start sector address of the partition calculated in step S1303 and the end sector address of the partition calculated in step S1304 are recorded in the first partition information 1206. In step S1307, the format processing unit 201 records the Backup GPT Header 1205 and the Backup GPT Entry Array 1204. The start address of the partition calculated in step S1303 and the end sector address of the partition calculated in step S1304 are recorded in first partition information 1207 in the Backup GPT Entry Array 1204. In step S1308, the format processing unit 201 records the BPB 302. The BPB is recorded from the start position of the first partition calculated in step S1303. In step S1309, the format processing unit 201 records the initial state of the FAT 303. A recording start position of the FAT 303 may be any address after the BPB 302. To make many clusters available, assume that the record start position of the FAT 303 is separated from the BPB 302 by 1 SPC. In step S1310, the format processing unit 201 records the system cluster, and the format processing ends.

In this manner, also in the case of the GPT format, the present exemplary embodiment causes an area that is inappropriate for recording real-time data in terms of a format to serve as the area for directory, thereby enabling recording of the data without decreasing capacity efficiency of the recording medium 109.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-152798, filed Aug. 23, 2019, which is hereby incorporated by reference herein in its entirety.

What is claimed is:

1. A control apparatus configured to record data in a recording medium, the control apparatus comprising:
 a cluster management unit configured to manage a plurality of clusters in a predetermined area in a recording area of the recording medium;
 a recording management unit configured to manage clusters of the plurality of clusters in the predetermined area by using a plurality of allocation units, each of the allocation units having a predetermined allocation unit size that is larger than a size of each of the clusters of the plurality of clusters; and
 a directory cluster allocation unit configured to allocate a cluster of the plurality of clusters in the predetermined area to a directory cluster in which a directory is recorded, the directory indicating, for each of a plurality of pieces of data recorded in the predetermined area, associated metadata for the piece of data,
 wherein the directory cluster allocation unit is configured to preferentially allocate a free cluster in an allocation unit in which one or more of the clusters in the allocation unit are already being used as a system cluster, out of the clusters managed by the recording management unit, to the directory cluster, and wherein, in a case where there is no free cluster in the allocation unit containing the system cluster, the directory cluster allocation unit is configured to allocate, to the directory cluster, a cluster in a tail end area in the predetermined area, the tail end area being managed by the cluster management unit and not by the recording management unit, and the tail end area being less in size than a size of each of the allocation units having the predetermined allocation unit size.

2. The control apparatus according to claim 1, wherein the cluster management unit is configured to manage the predetermined area by using a File Allocation Table (FAT).

3. The control apparatus according to claim 1, wherein the recording management unit is configured to manage the plurality of clusters in the predetermined area in the allocation units, to record data in Speed Class that guarantees a recording speed.

4. The control apparatus according to claim 1,
wherein the cluster management unit is configured to manage the predetermined area in clusters partitioned at an interval of a predetermined cluster size, and
wherein the recording management unit is configured to partition the recording area of the recording medium including an area outside the predetermined area at an interval of the predetermined allocation unit size from a head of the recording area, and
manage, in the predetermined area, an allocation unit of the plurality of allocation units where the one or more clusters in the allocation unit occupy an entirety of the allocation unit, and the allocation unit has the predetermined allocation unit size.

5. The control apparatus according to claim 1, wherein the allocation unit containing the system cluster is in a head area in the predetermined area.

6. The control apparatus according to claim 1, wherein the directory cluster allocation unit is configured to allocate, in response to depletion of free clusters in the clusters in the tail end area, a cluster out of the plurality of clusters managed by the recording management unit, to the directory cluster.

7. The control apparatus according to claim 1, wherein the recording medium is a Secure Digital (SD) card.

8. The control apparatus according to claim 1, wherein the recording medium is a recording medium in conformity with a CFexpress standard.

9. A control method of controlling a recording apparatus to record data in a recording medium in which a plurality of clusters is managed in a predetermined area in a recording area, the control method comprising:
managing a plurality of allocation units to manage clusters of the plurality of clusters in the predetermined area by using the allocation units, each of the allocation units having a predetermined allocation unit size that is larger than a size of each of the clusters of the plurality of clusters; and
allocating a directory cluster to allocate a cluster of the plurality of clusters in the predetermined area to a directory cluster in which a directory is recorded, the directory indicating, for each of a plurality of pieces of data recorded in the predetermined area, associated metadata for the piece of data,
wherein the allocating a directory cluster is configured to preferentially allocate a free cluster in an allocation unit in which one or more of the clusters in the allocation unit are already being used as a system cluster, out of the clusters managed by the recording management unit, to the directory cluster, and
wherein, in a case where there is no free cluster in the allocation unit containing the system cluster, the allocating a directory cluster includes allocating, to the directory cluster, a cluster in a tail end area in the predetermined area, the tail end area being managed by the managing of the predetermined area in the recording area in clusters and not by the managing of the allocation units, and the tail end area being less in size than a size of each of the allocation units having the predetermined allocation unit size.

10. A non-transitory computer-readable storage medium storing a program that when executed by a computer, causes the computer to perform a method of controlling a recording apparatus to record data in a recording medium in which a plurality of clusters is managed in a predetermined area in a recording area, the control method comprising:
managing a plurality of allocation units to manage clusters of the plurality of clusters in the predetermined area by using the allocation units, each of the recording units having a predetermined allocation unit size that is larger than a size of each of the clusters of the plurality of clusters; and
allocating a directory cluster to allocate a cluster of the plurality of clusters in the predetermined area to a directory cluster in which a directory is recorded, the directory indicating, for each of a plurality of pieces of data recorded in the predetermined area, associated metadata for the piece of data,
wherein the allocating a directory cluster is configured to preferentially allocate a free cluster in an allocation unit in which one or more of the clusters in the allocation unit are already being used as a system cluster, out of the clusters managed by the recording management unit, to the directory cluster, and
wherein, in a case where there is no free cluster in the allocation unit containing the system cluster, the allocating a directory cluster includes allocating, to the directory cluster, a cluster in a tail end area in the predetermined area, the tail end area being managed by the managing of the predetermined area in the recording area in clusters and not by the managing of the allocation units, and the tail end area being less in size than a size of each of the allocation units having the predetermined allocation unit size.

* * * * *